United States Patent [19]

Imai

[11] Patent Number: 4,580,043

[45] Date of Patent: Apr. 1, 1986

[54] APPARATUS FOR DETECTING FOCUS CONDITION OF IMAGING LENS HAVING A CIRCULAR DETECTING ARRAY

[75] Inventor: Yuji Imai, Higashiyamato, Japan

[73] Assignee: Olympus Optical Company Limited, Tokyo, Japan

[21] Appl. No.: 576,577

[22] Filed: Feb. 3, 1984

[30] Foreign Application Priority Data

Feb. 10, 1983 [JP] Japan .................................. 58-19591

[51] Int. Cl.⁴ .............................................. G01J 1/20
[52] U.S. Cl. ..................................... 250/201; 354/406
[58] Field of Search ............... 250/201, 204, 208, 209; 354/406, 407, 408

[56] References Cited

U.S. PATENT DOCUMENTS

4,246,476  1/1981  Stauffer ................. 250/201

Primary Examiner—David C. Nelms
Attorney, Agent, or Firm—Parkhurst & Oliff

[57] ABSTRACT

An apparatus for detecting a focal condition of an imaging lens on the basis of the lateral image shift detection method including a stripe mask array having a plurality of stripe masks arranged radially about an optical axis of the imaging lens at a constant pitch and a light receiving element array having a plurality of light receiving elements arranged radially about the optical axis of the imaging lens in such a manner that two light fluxes transmitted through upper and lower halves of the aperture of the imaging lens are selectively received by alternate light receiving elements belonging to first and second groups, respectively. Two images formed by the two light fluxes are shifted relative to each other in clockwise and counterclockwise directions, respectively, in accordance with a defocus condition.

12 Claims, 38 Drawing Figures

FIG_11A
Forward Defocus

FIG_11B
Infocus

FIG_11C
Backward Defocus

FIG_11D
Forward Defocus

FIG_11E
Infocus

FIG_11F
Backward Defocus

APPARATUS FOR DETECTING FOCUS CONDITION OF IMAGING LENS HAVING A CIRCULAR DETECTING ARRAY

BACKGROUND OF THE INVENTION

This invention relates to an apparatus for detecting a focus condition of an imaging lens provided in optical devices such as still camera, cine camera and microscope.

Figure 1:
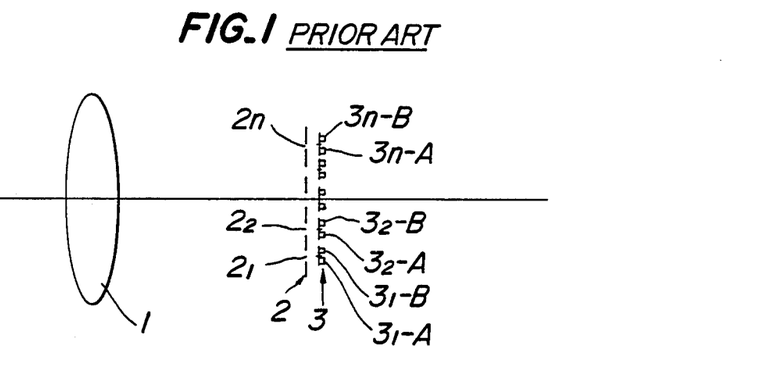
FIG. 1 is a schematic view showing a principal construction of a known focus detection apparatus on the basis of a lateral image shift detection method.

FIG. 1 is a schematic view illustrating a principal construction of a known focus detection apparatus using a focus detection principle of lateral image shift. The known apparatus comprises means for forming laterally shifted images consisting of a plurality of small lens aperture dividing optical systems $2_k$ ($1 \leq k \leq n$) for dividing an exit pupil of an imaging lens 1, and a light receiving element array 3 consisting of n pairs of light receiving elements $3_k$-A and $3_k$-B ($1 \leq k \leq n$), each pair being arranged in relation to a respective one of the lens aperture dividing optical systems $2_k$ so as to receive light fluxes emanating from different regions of the exit pupil of the imaging lens 1. The light receiving element array 3 is arranged in a predetermined focal plane of the imaging lens 1 or a plane conjugated with the focal plane or near these planes. By this construction, an odd numbered light receiving element array, i.e. a first element array $3_1$-A, $3_2$-A ... $3_n$-A and an even numbered light receiving element array, i.e. a second element array $3_1$-B, $3_2$-B ... $3_n$-B receive images which are laterally shifted with respect to each other in opposite directions in accordance with a defocus condition. Therefore, by suitably processing photoelectrically converted outputs from the first and second light receiving element arrays, it is possible to evaluate the focal condition of the imaging lens 1.

In the above known apparatus, the lens aperture dividing optical system comprises a stripe mask array 2 and the paired light receiving elements $3_n$-A and $3_n$-B of the array 3 are arranged symmetrically with respect to respective light transmitting portions $2_n$ of the stripe mask array 2, so that the paired light receiving elements $3_n$-A and $3_n$-B receive separately the light fluxes emanating from the different regions of the exit pupil of imaging lens 1. Therefore, in order to detect the focal condition of the imaging lens 1 in an accurate manner, it is desired that the light receiving element pairs $3_n$-A and $3_n$-B receive the light fluxes which equally divide the exit pupil of the imaging lens 1.

Figure 2:
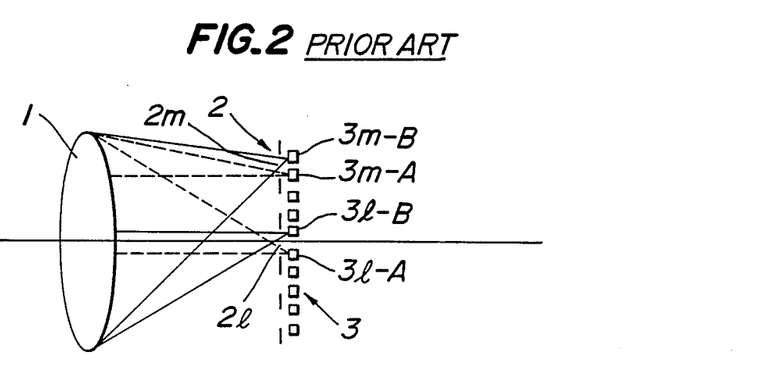
FIG. 2 is a schematic view showing the influence of image height in the known apparatus.

However, as illustrated in FIG. 2, in the known focus detection apparatus, although paired light receiving elements $3_l$-A and $3_l$-B arranged near an optical axis receive equally divided light fluxes, paired light receiving elements $3_m$-A and $3_m$-B arranged remote from the optical axis receive differently divided light fluxes. Thus, even in an infocus condition the outputs from paired light receiving elements of the first and second element arrays differ from each other and thus the focus condition could not be detected accurately. Such a phenomenon is sometimes called an influence of image height.

Figure 3:
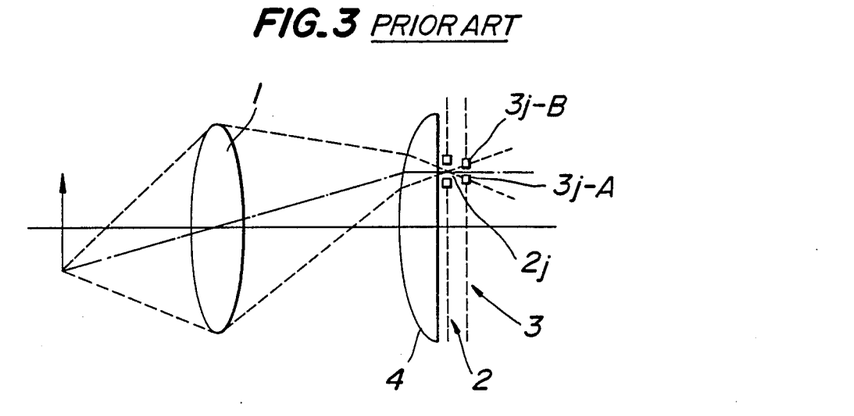
FIG. 3 is a schematic view showing a known focus detection apparatus in which the influence of image height is compensated for by means of a correction lens.

In order to avoid such a drawback, it has been proposed to arrange a correction lens 4 between the imaging lens 1 and the means 3 for producing the laterally shifted images, i.e. the stripe mask as shown in FIG. 3. Such a correction lens 4 can guarantee the introduction of the uniform light fluxes onto the first and second light receiving elements arrays. However, in such a known apparatus, when the imaging lens is exchanged, the correction lens 4 can no longer compensate for the influence of image height optimally. Moreover, the correction lens 4 increases the number of parts and adjustments. Further, in some optical devices, it is difficult to find a space for arranging the correction lens.

SUMMARY OF THE INVENTION

The present invention has for its object to provide a novel and useful apparatus for detecting a focal condition of an imaging lens in an accurate manner without using the above mentioned correction lens.

It is another object of the invention to provide an apparatus for detecting a focal condition of an imaging lens, in which the focal condition can be detected over a wide range in a precise manner not only by the lateral image shift detection method, but also by the contrast detection method.

It is still another object of the invention to provide an apparatus for detecting a focus condition of an imaging lens, in which the focus condition can be detected precisely even if an object has a contrast line extending in any direction.

According to the invention, an apparatus for detecting a focus condition of an imaging lens comprises:
  means comprising a lens aperture dividing optical system array arranged circularly about an optical axis of the imaging lens for dividing an exit pupil of the imaging lens to produce laterally shifted images; and
  means comprising a light receiving element array arranged circularly about the optical axis of the imaging lens for receiving the laterally shifted images.

According to a further aspect of the invention, an apparatus for detecting a focus condition of an imaging lens comprises:
  means for dividing a light flux emanating from the imaging lens into first and second light fluxes;
  a first lateral image shift detection device comprising a first lens aperture dividing optical system array arranged circularly about an optical axis of the imaging lens for receiving the first light flux to divide an aperture of the imaging lens to produce a first pair of laterally shifted images, and a first light receiving element array arranged circularly about the optical axis of the imaging lens for receiving the first pair of laterally shifted images; and
  a second lateral image shift detection device comprising a second lens aperture dividing optical system array arranged circularly about the optical axis of the imaging lens for receiving the second light flux to divide the aperture of the imaging lens to produce a second pair of laterally shifted images, and a second light receiving element array arranged circularly about the optical axis of the imaging lens for receiving the second pair of laterally shifted images, whereby said first and second lateral image shift detection devices are arranged behind and before a predetermined focal plane of the imaging lens, respectively.

DESCRIPTION OF THE PREFERRED EMBODIMENTS

Figure 4:
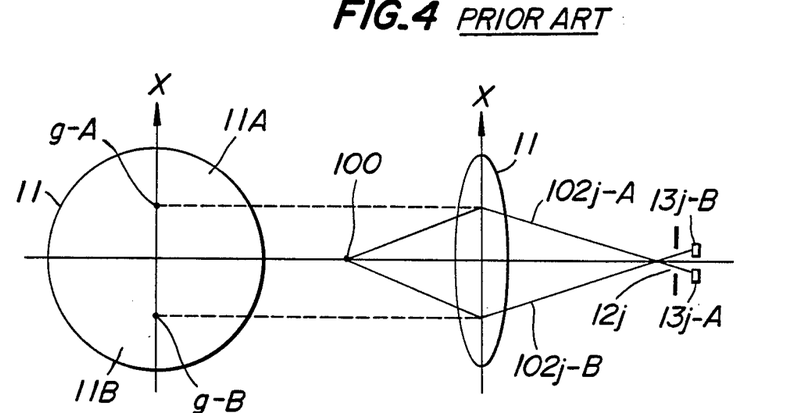
FIG. 4 is a schematic view depicting paths of center light rays.
Figure 5:
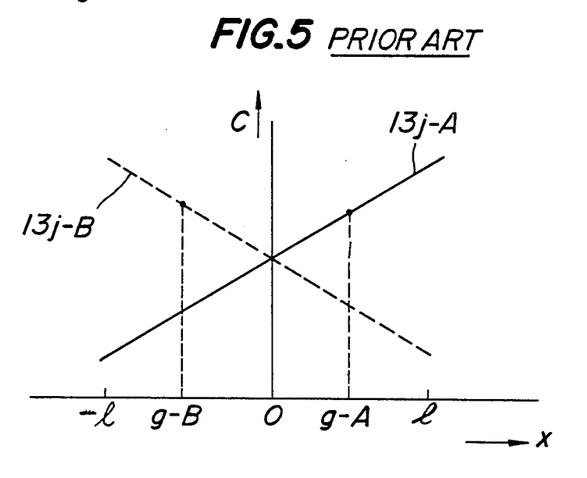
FIG. 5 is a graph depicting a relation between positions in a lens aperture through which the light flux passes and a light receipt coefficient.

At first, the principle of the lateral image shift will be explained with reference to FIG. 4. Light rays emitted from a point light source 100 on an optical axis are transmitted through an imaging lens 11 and are received by light receiving elements $13_j$-A and $13_j$-B. Since incident angles of the light rays impinging upon the light receiving elements are different from each other depending upon positions in the lens aperture through which the light rays transmit, the light receiving element $13_j$-A receives a light flux emanating substantially from an upper half region 11A of the imaging lens 11 and the light receiving element $13_j$-B receives a light flux transmitted through a lower half region 11B of the lens 11. Now, it is assumed that a direction passing through the optical axis in the aperture of imaging lens 11 and extending in parallel with a direction along which the light receiving element array is arranged is defined as X axis, and that a ratio of a light amount received by respective elements of the paired light receiving elements $13_j$-A and $13_j$-B with respect to a total amount of light impinging upon the paired light receiving elements $13_j$-A and $13_j$-B is denoted as a light receipt coefficient C. FIG. 5 shows a relation between a distance x measured along the X axis from the optical axis and the light receipt coefficient C. In FIG. 5, solid and broken lines denote a variation in the light receipt coefficient of the light receiving elements $13_j$-A and $13_j$-B, respectively. The light receipt coefficient C of the element $13_j$-A becomes maximum at a position x=1 corresponding to a peripheral point of the aperture of the imaging lens, and decreases linearly toward a position x=−1 corresponding to a diametrically opposing peripheral point of the aperture. Contrary to this, the light receipt coefficient C of the other element $13_j$-B is maximum at the point x=−1 and is minimum at the point x=1. As illustrated in FIG. 5, the light receipt coefficients of these paired light receiving elements vary symmetrically with respect to the optical axis (x=0). Now, central points g-A and g-B are defined in such a manner that when light amounts received by light receiving elements are accumulated from the positions x=1 and −1, accumulated values become a half of a total accumulated amount at the central points g-A and g-B, respectively. Light rays passing through the center points g-A and g-B represent characteristics of the light fluxes received by the light receiving elements.

Figure 6:
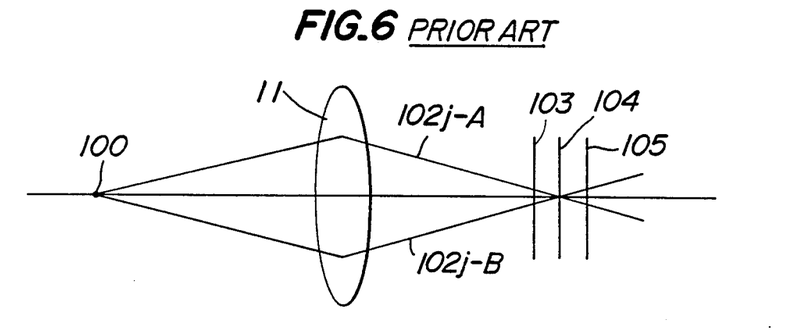
FIG. 6 is a schematic view showing the paths of center light rays.
Figure 7A:
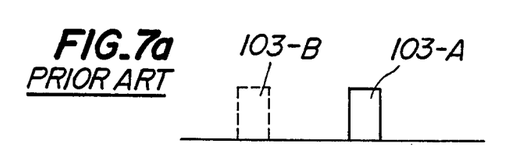
FIGS. 7A, 7B and 7C are image patterns formed on the known focus detection apparatus.
Figure 7B:
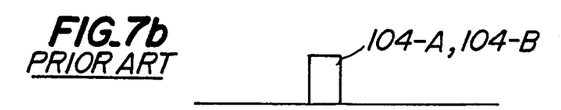
Figure 7C:
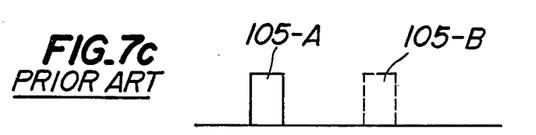

FIG. 6 shows paths of the center light rays $102_j$-A and $102_j$-B emitted from the point light source 100 and received by the light receiving elements $13_j$-A and $13_j$-B, respectively. Reference numerals 103, 104 and 105 denote forward defocus position, infocus position and backward defocus position. FIGS. 7A, 7B and 7C show image patterns 103-A, 103-B, 104-A, 104-B, and 105-A, 105-B which are received by the first and second light receiving element arrays situated at the positions 103, 104 and 105, respectively. At the defocus positions 103 and 105, the laterally shifted images are formed upon the first and second light receiving element arrays, but in the infocus position, the images formed upon the first and second arrays are superimposed upon each other completely. As explained above, the image lateral shift occurs when the center light rays $102_j$-A and $102_j$-B do not coincide with each other on the predetermined focal plane.

In the known focus detection apparatus, paired light receiving elements situated remote from the optical axis do not receive equal light fluxes even in the infocus condition, and the focus detection can not be performed accurately. The present invention is to obviate such a drawback by means of a simple construction.

Figure 8:
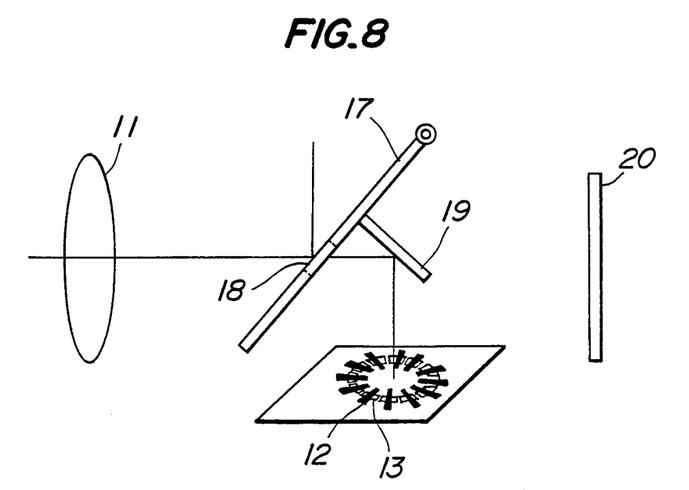
FIG. 8 is a schematic view of an embodiment of the focus detection apparatus according to the invention applied to a single lens reflex camera.

FIG. 8 is a schematic view showing an embodiment of the focus detection apparatus according to the invention. A light flux emanating from an imaging lens 11 of a single lens reflex type camera is divided into two parts by means of a half mirror 18 provided at the center of a quick return mirror 17. A light flux reflected by the quick return mirror 17 and half mirror 18 is introduced into a finder system (not shown) and a light flux transmitted through the half mirror 18 is reflected by a mirror 19 secured to the rear surface of the quick return mirror 17 and then is introduced into the focus detection apparatus comprising a stripe mask array 12 and a light receiving element array 13 which are arranged circularly about an optical axis of the imaging lens 11. That is, stripe masks of the stripe mask array 12 and light receiving elements of the element array 13 are arranged radially about the optical axis of the imaging lens. By arranging the stripe mask array 12 and light receiving element array 13 along a circle having a center in the optical axis of imaging lens 11, distances from the optical axis to all light receiving elements become equal to each other and thus the light receiving elements can receive the light flux uniformly to avoid the above explained drawback due to the image height; thus, accurate focus detection can be performed. In FIG. 8, reference numeral 20 denotes a photographic film.

Figure 9A:
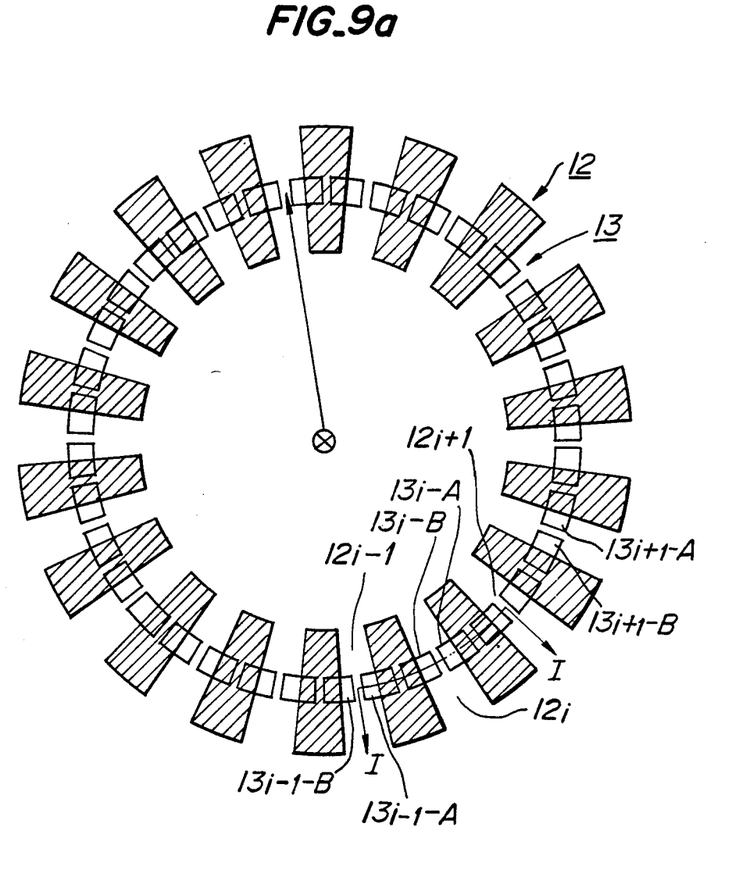
FIGS. 9A and 9B are a plan view and cross sectional view, respectively, illustrating stripe mask array and light receiving element array according to the invention.
Figure 9B:
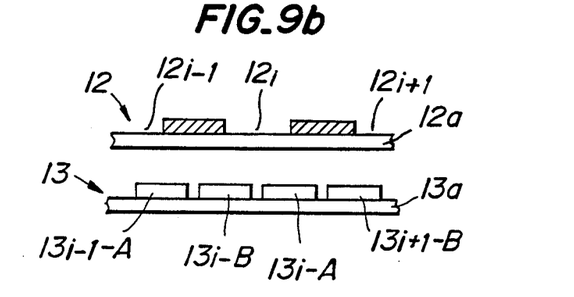

FIGS. 9A and 9B illustrate a detailed construction of the stripe mask array 12 and light receiving element array 13. FIG. 9A is a plan view and FIG. 9B is a cross sectional view cut along a line I—I in FIG. 9A. The light receiving element array 13 includes 2n light receiving elements which are arranged equidistantly along a circle on a substrate 13a. Odd numbered light receiving elements constitute a first array 13-A and even numbered light receiving elements form a second array 13-B and adjacent elements $13_1$-A, $13_1$-B; $13_2$-A, $13_2$-B; . . . $13_n$-A, $13_n$-B constitute element pairs. The stripe mask array 12 comprises a transparent substrate 12a on which n stripe masks, i.e. transparent stripes $12_1$ to $12_n$ are formed equidistantly by means of evaporation or printing. The substrate 12a may be made of glass or high molecular film. The stripe masks $12_1$ to $12_n$ are arranged circularly so as to shield parts of the light receiving elements.

Figure 10A:
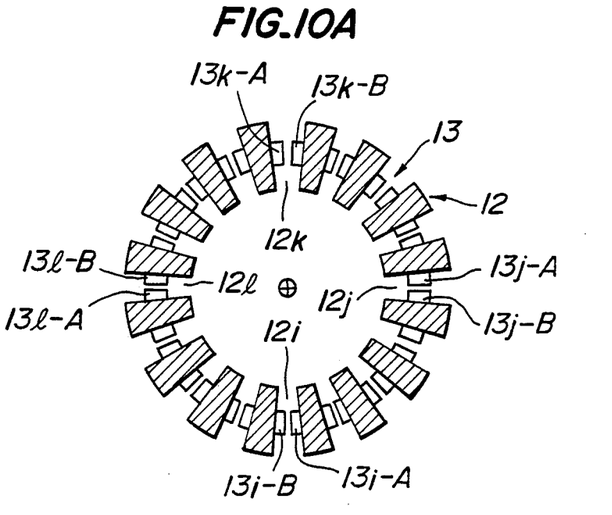
FIGS. 10A, 10B, 10C, 10D and 10E illustrate center positions of respective light receiving elements and the light receipt coefficient.
Figure 10B:
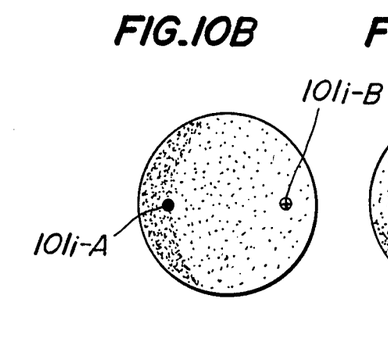
Figure 10C:
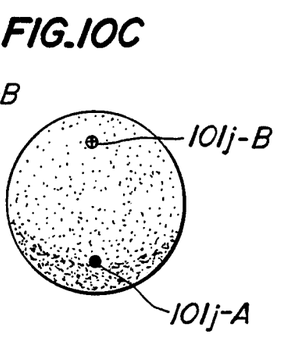
Figure 10D:
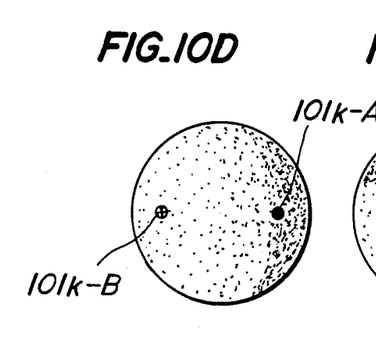
Figure 10E:
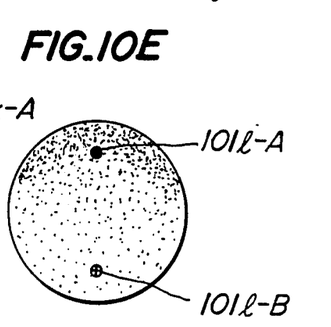

Now, there will be explained how to generate the laterally shifted images by means of the circularly arranged stripe mask array 12 and light receiving element array 13. Among the light receiving elements of the array 12 arranged circularly as shown in FIG. 10A, center positions $101_i$-A, $101_i$-B; $101_j$-A, $101_j$-B; $101_k$-A, $101_k$-B; $101_l$-A, $101_l$-B on the lens aperture corresponding to paired light receiving elements $13_i$-A, $13_i$-B; $13_j$-A, $13_j$B; $13_k$-A, $13_k$-B; $13_l$-A, $13_l$-B and the light receipt coefficients of these elements are illustrated in FIGS. 10B to 10E. In FIGS. 10B to 10E, the density of dots denotes the light receipt correspond for the first light receiving elements $13_i$-A, $13_j$-A, $13_k$-A and $13_l$-A. Therefore, in a dark area, the coefficient of the first array is high and that of the second array is low. The center positions of the paired light receiving elements situate always symmetrically with respect to the optical axis and the center positions in respective arrays move in a circumferential direction. Therefore, each light receiving element receives images which are shifted in a tangential direction and as a result, the light receiving elements receive the images which are relatively shifted in a circumferential direction. That is to say, the image patterns projected upon the first and second light receiving element arrays are shifted relative to each other in clockwise or counter-clockwise direction depending upon the direction of defocus.

Figure 11A:
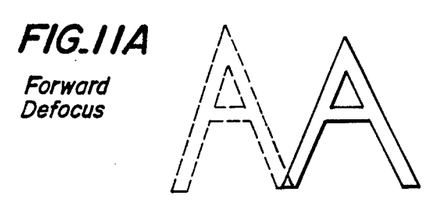
FIGS. 11A, 11B, 11C, 11D, 11E and 11F show shifts of image patterns in the known apparatus and in the apparatus according to the invention.
Figure 11B:
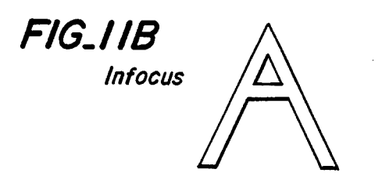
Figure 11C:
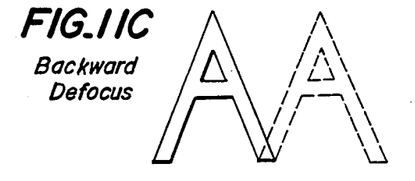
Figure 11D:
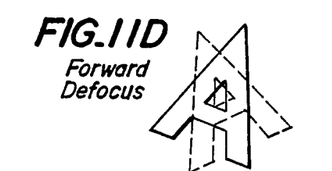
Figure 11E:
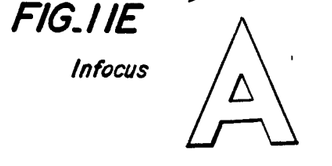
Figure 11F:
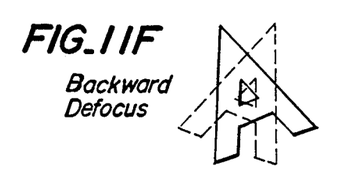

FIGS. 11A, 11B and 11C show the image patterns projected upon the linear light receiving element arrays in the known focus detection apparatus in the forward defocus, infocus and backward defocus conditions, respectively, and FIGS. 11D, 11E and 11F illustrate the image patterns formed on the circular light receiving element arrays of the focus detection apparatus according to the invention in the case of forward defocus, infocus and backward defocus conditions, respectively. As shown in the drawings, in the known apparatus the image patterns are relatively shifted linearly, while in the apparatus according to the invention, the image patterns are rotated about the optical axis in the opposite directions. It should be noted that the laterally shifted image producing means, i.e. the stripe masks and the light receiving elements are not always necessary to be arranged along the whole circle, but may be arranged over a part of the circle.

Figure 12A:
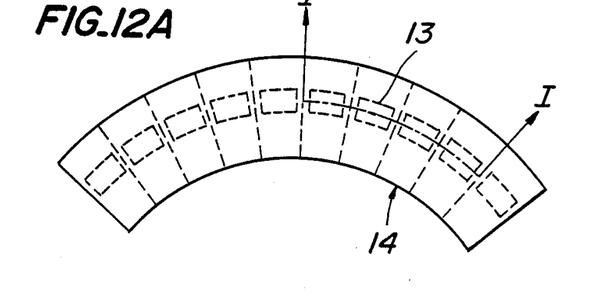
FIGS. 12A and 12B are plan and cross sectional views, respectively showing another embodiment of the focus detection apparatus according to the invention, in which a microprism array is used.
Figure 12B:
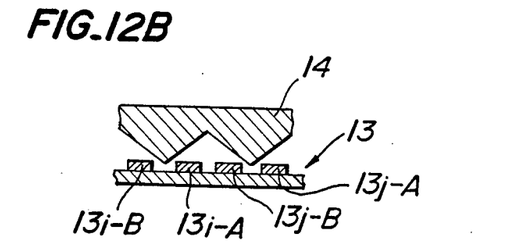

FIGS. 12A and 12B show another embodiment of the focus detection apparatus according to the invention. In the present embodiment, a microprism array 14 serving as the laterally shifted image generating means, i.e. the lens aperture dividing means and a light receiving element array 13 are arranged along a part of a circumference of a circle having a center in the optical axis of the imaging lens. In the present embodiment, a microprism comprises first and second optical surfaces, the first surface transmitting a first light flux emanating from a first area of an exit pupil of the imaging lens, but totally reflecting a second light flux emanating from a second region of the exit pupil of the imaging lens, and the second optical surface totally reflecting the first light flux, but transmitting the second light flux. By means of such a microprism array, it is also possible to the divide the exit pupil of imaging lens. Also in the present embodiment, by arranging the microprism array 14 and light receiving element array 13 circularly about the optical axis of the imaging lens, respective light receiving elements of element array 13 receive uniform light fluxes to compensate for the influence of the image height. In the present embodiment, the microprism array 14 and light receiving element array 13 are arranged over a quarter of the circle, but they may be arranged over the whole circumference of a circle.

Figure 13A:
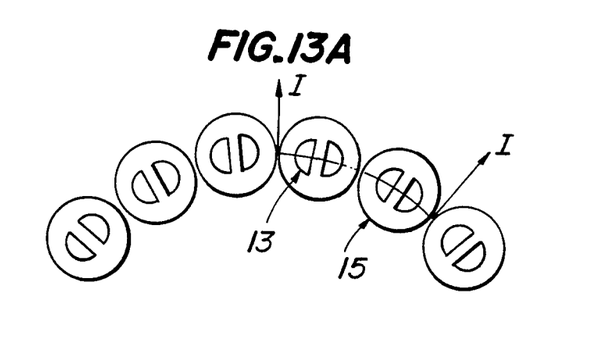
FIGS. 13A and 13B are plan and cross-sectional views, respectively, depicting still another embodiment of the focus detection apparatus according to the invention.
Figure 13B:
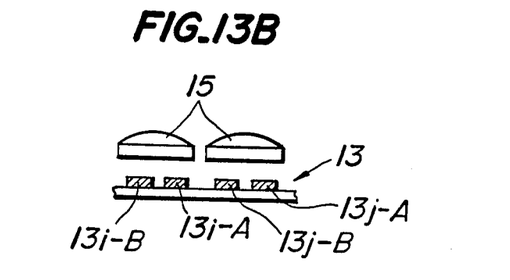

FIGS. 13A and 13B show another embodiment of the focus detection apparatus according to the invention. In the present embodiment, a fly-eye lens array 15 and a light receiving element array 13 are arranged along a part of a circumference of a circle having a center in an optical axis of an imaging lens. The fly-eye lens array 15 is provided on or near a predetermined focal plane of the imaging lens and the light receiving element array 13 is positioned on or near a focal plane of the fly-eye lens array 15.

Figure 14:
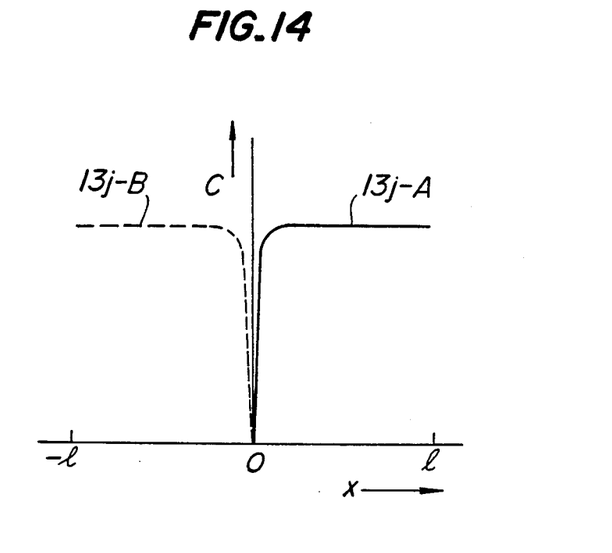
FIGS. 14, 15 and 16 are graphs for explaining the operation of the focus detection apparatus according to the invention.
Figure 15:
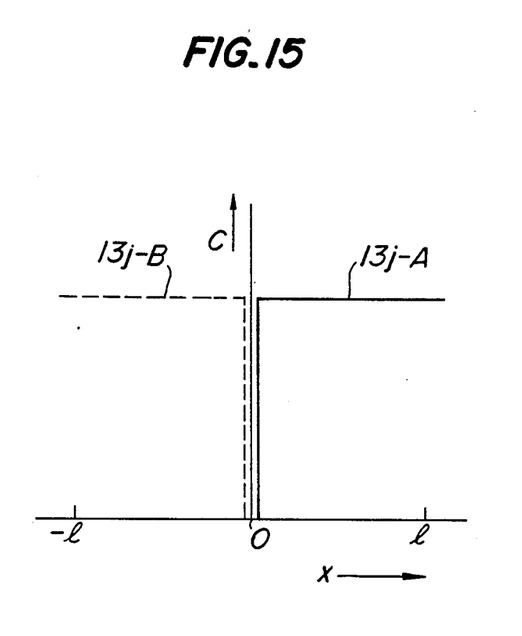

FIG. 14 shows a relation between a position x on the lens aperture at which a light ray emanating from the object passes through the imaging lens, and the light receipt coefficient C of a pair of light receiving elements $13_j$-A and $13_j$-B in the case of using the microprism array illustrated in FIGS. 12A and 12B. FIG. 15 depicts a similar relation in the case of using the fly-eye lens array shown in FIGS. 13A and 13B. From the relations depicted in FIGS. 14 and 15, it is apparent that the light receiving element $13_j$-A belonging to the first element array receives substantially only the light flux transmitted through the upper half of the aperture of the imaging lens, and the light receiving element $13_j$-B belonging to the second element array receives substantially only the light flux passing through the lower half of the lens aperture. It can be further understood that in the case of using the fly-eye lens array, the division of the exit pupil can be effected more completely than in the case of using the microprism array. Further, the paired light receiving elements receive the uniform light fluxes regardless of the position in the array.

Next, a manner of deriving a focus condition signal from the photoelectrically converted outputs from the light receiving element array will be explained. It is assumed that outputs of the light receiving elements $13_j$-A of the first element group are denoted by $A_j$ (j=1, 2 ... n) and those of the second element group are represented by $B_j$ (j=1, 2 ... n). Then, an estimation function F representing an amount and a direction of the lateral shift of the images projected upon the first and second element groups can be given as follows:

$$F = \sum_{j=1}^{n} (|A_{j+1} - B_{j-1}| - |A_j - B_{j+1}|)$$

Figure 16:
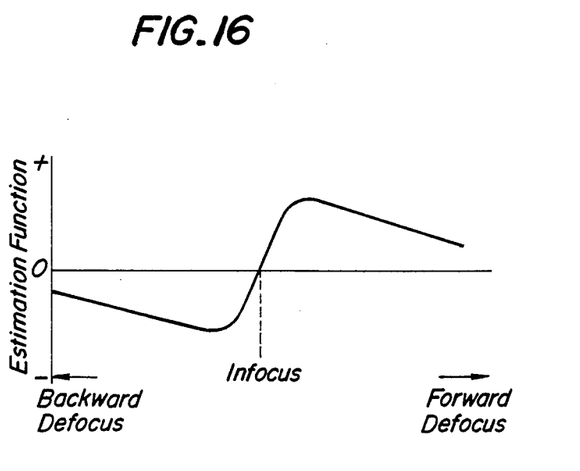

FIG. 16 shows the variation of estimation function F in accordance with the focus condition. In the infocus position, the estimation function F becomes zero and in the forward and backward defocus positions, the estimation function F becomes positive and negative, respectively. In this manner, by deriving the estimation function F from the outputs of the light receiving elements, the focus condition of the imaging lens can be detected accurately over a very wide range.

In the embodiments so far explained, the focus detection is effected only by the lateral image shift detection method. However, the focus detection apparatus according to the invention can also be used for detecting the focus condition not only by the lateral image shift detection method, but also by the contrast detection method. That is to say, two sets of means for generating the lateral image shift and light receiving element arrays may be arranged on respective sides of the predetermined focal plane. Then a first focus detection signal may be derived by processing the outputs from the light receiving elements of either one of the first and second sets on the basis of the above explained lateral image shift detection method and a second focus detection signal may be derived by processing the outputs of the light receiving elements of both the first and second sets on the basis of the contrast detection method. A few embodiments of the focus detection apparatus according to the invention which are used for detecting the focus condition on the basis of both the lateral image shift detection method and the contrast detection method will be explained.

Figure 17A:
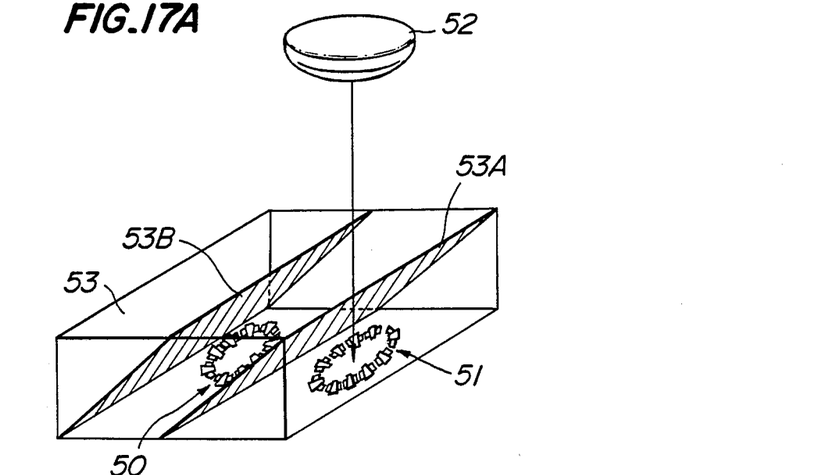
FIGS. 17A, 17B and 17C show another embodiment of the focus detection apparatus according to the invention.
Figure 17B:
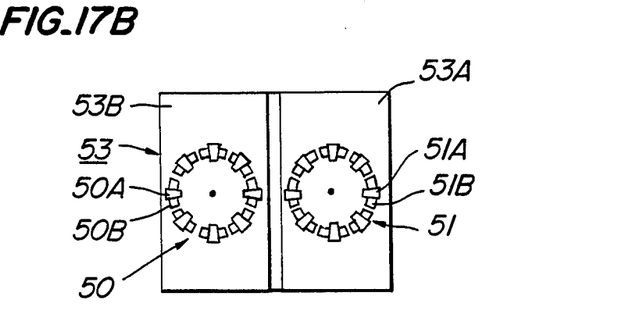
Figure 17C:
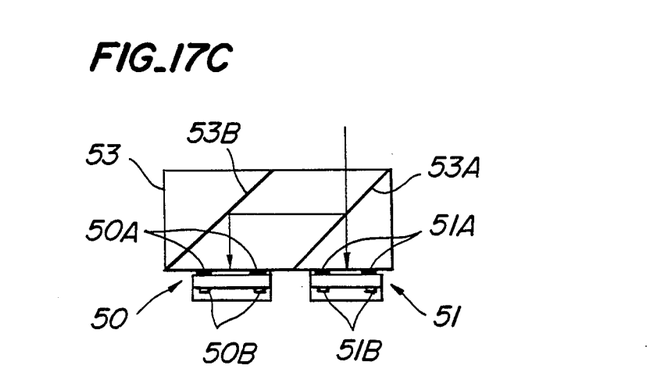

FIGS. 17A, 17B and 17C show an embodiment of the focus detection apparatus according to the invention. In the present embodiment, first and second lateral image shift detection devices 50 and 51 are arranged on respective sides of a predetermined focal plane. The first lateral image shift detection device 50 comprises a stripe mask array 50A and a light receiving element array 50B which are arranged circularly about an optical axis of an imaging lens 52, and the second lateral image shift detection device 51 includes a stripe mask array 51A and a light receiving element array 51B which are arranged circularly about the optical axis of imaging lens 52. A light flux emanating from the imaging lens 52 is introduced into a prism 53 including a half mirror 53A and a reflection mirror 53B and a light flux reflected by the half mirror 53A and reflection mirror 53B successively is made incident upon the first lateral image shift detection device 50 and a light flux transmitted through the half mirror 53A is made incident upon the second lateral image shift detection device 51. Then by processing the photoelectrically converted outputs from the light receiving element array of the first and/or second lateral image shift detection devices 50 and 51 in the manner explained above, it is possible to derive a first estimation function $F_1$ representing the focus condition of the imaging lens 52 on the basis of the lateral image shift detection method. At the same time, the outputs from the paired light receiving elements are summed to produce sum signals and then differences between the sum signals of the first device 50 and corresponding sum signals of the second device 51 are derived to produce a second estimation function $F_2$ on the basis of the contrast detection method. By means of the thus derived first and second estimation functions $F_1$ and $F_2$, the focus detection can be performed in a very precise manner over quite a wide range.

Figure 18A:
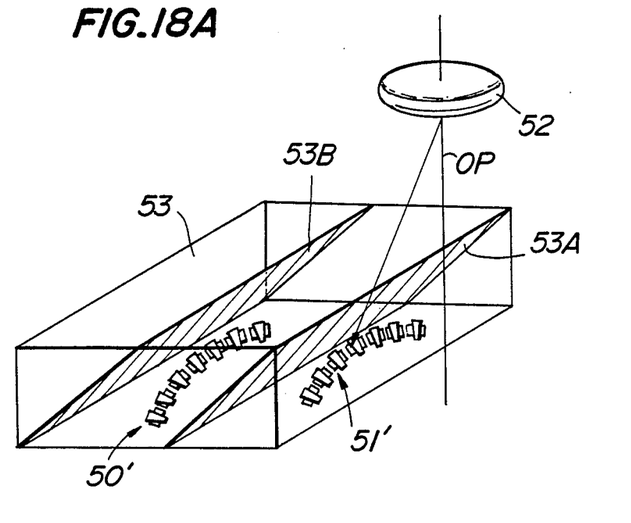
FIGS. 18A, 18B and 18C illustrate another embodiment of the focus detection apparatus according to the invention.
Figure 18B:
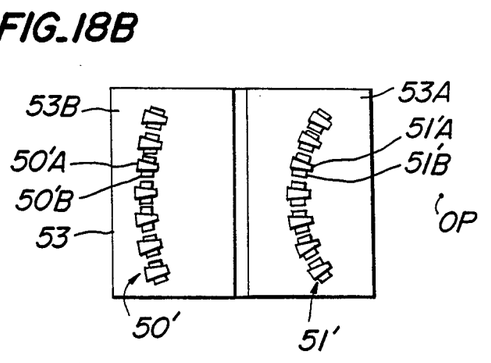
Figure 18C:
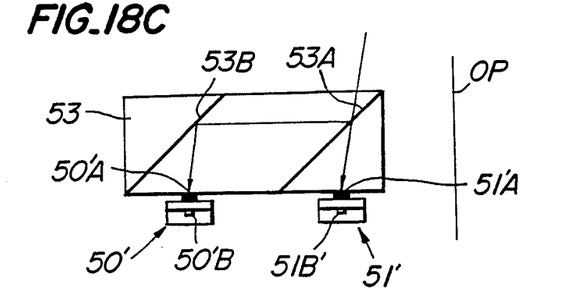

FIGS. 18A, 18B and 18C illustrate another embodiment of the focus detection apparatus according to the invention. In the present embodiment, first and second lateral image shift detection devices 50' and 51' comprise stripe mask arrays 50'A, 51'A and light receiving element arrays 50'B. 51'B which are arranged along a circle over a part of the circumference thereof. Then, a prism 53 including a half mirror 53A and a reflection mirror 53B is shifted laterally with respect to an optical axis OP of an imaging lens 52. In the present embodiment, the first and second lateral image shift detection devices 50' and 51' and the prism 53 can be made smaller in size than the embodiment shown in FIGS. 17A to 17C. Also in this embodiment, the focus condition of the imaging lens can be detected accurately over a wide range by means of both the lateral image shift detection method and contrast detection method.

Figure 19A:
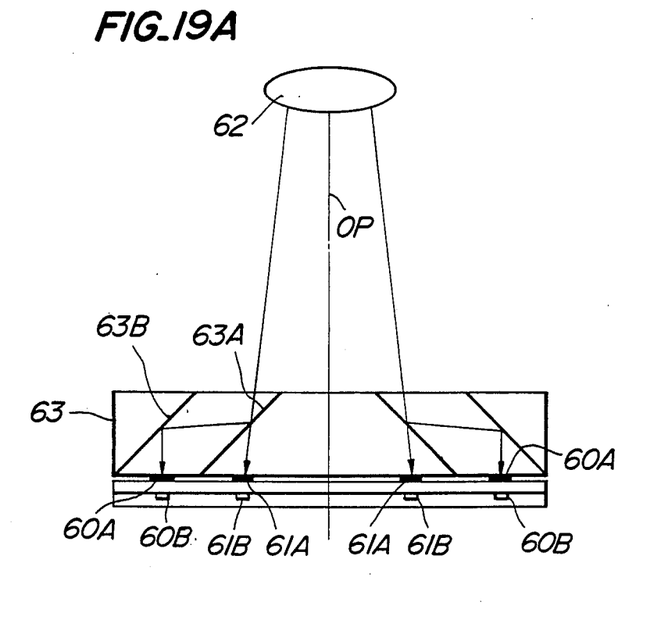
FIGS. 19A and 19B show still another embodiment of the focus detection apparatus according to the invention.
Figure 19B:
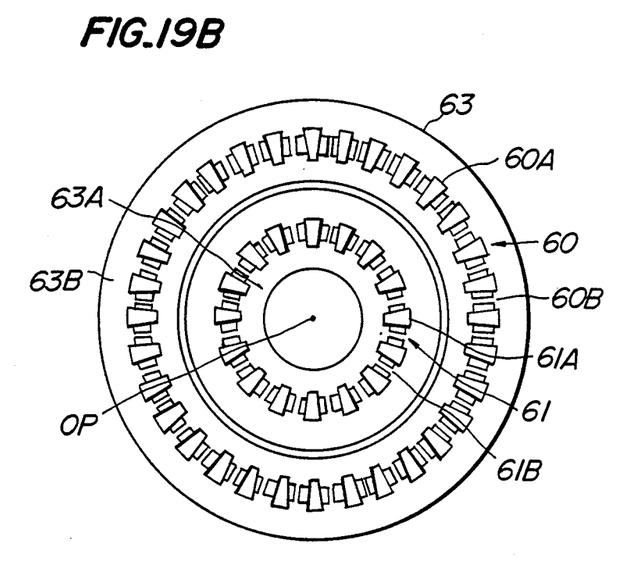

FIGS. 19A and 19B show still another embodiment of the focus detection apparatus according to the invention. In the present embodiment, first and second lateral image shift detection devices 60 and 61 are arranged concentrically about an optical axis OP of an imaging lens 62. The first device 60 comprises a stripe mask array 60A and a light receiving element array 60B arranged along a first circle, and the second device 61 comprises a stripe mask array 61A and a light receiving element array 61B arranged also along a second circle which is concentric with the first circle. Above the devices 60 and 61 is arranged a disc shaped prism 62 including a frustoconical half mirror 63A and a frustoconical reflection mirror 63B. These mirrors are arranged concentrically with the first and second devices 60 and 61. A light flux reflected by the half mirror 63A and reflection mirror 63B successively is made incident upon the first device 60 which is positioned behind a predetermined focal point of the imaging lens 62. A light flux transmitted through the half mirror 63A is made incident upon the second device 61 situating before the predetermined focal point. Also in the present embodiment, the first estimation function $F_1$ can be derived by processing the outputs from the light receiving elements of the first and/or second devices 60 and 61 on the basis of the lateral image shift detection method and a second estimation function $F_2$ can be obtained by processing the outputs from both the first and second devices 60 and 61. In the present embodiment, the whole construction of the focus detection apparatus can be made small even if the lateral image shift detection devices 60 and 61 are arranged along the whole circumferences of concentric circles.

The present invention is not limited to the embodiments explained above, but many modifications and alternations could be conceived by those skilled in the art within the scope of the invention. For instance, in the embodiments shown in FIGS. 17 to 19, the second estimation function based upon the contrast detection method is derived from the sum signals of the paired light receiving elements, but the second estimation function may be obtained by comparing the contrast of the images formed on the first and second lateral image shift detection devices. Further, an additional light receiving element array may be provided in the lateral image shift detection device and the second estimation function based upon the contrast detection method may be derived from outputs of the additional light receiving element array.

As explained above in detail, according to the present invention since the lateral image shift generating optical systems and light receiving elements are arranged circularly, the light receiving elements receive the light flux uniformly and thus, precise focus detection can be performed without the influence of image height. Moreover, a regardless of the direction in which a boundary line having a large contrast change in the object extends, the focus detection can be effected precisely. It should be further noted that even if the object pattern is periodic in a linear direction, the focus detection can be effected precisely. In the known apparatus, in such a case, the infocus condition might be detected at several points in accordance with the movement of the imaging lens. In the known apparatus, when a thermal expansion coefficient of a substrate on which the stripe mask array is formed is different from that of a substrate on which the light receiving element array is arranged, a pitch of the stripe masks and that of the light receiving elements might be deviated due to a temperature variation and thus, the accuracy of focus detection might be decreased. Contrary to this, according to the invention, since the stripe mask array and light receiving element array are arranged circularly, the above pitches are varied equally and thus, the focus condition can be detected accurately without being influenced by the temperature variation.

What is claimed is:

1. An apparatus for detecting a focus condition of an imaging lens comprising:
   means comprising a lens aperture dividing optical system array arranged circularly about an optical axis of the imaging lens for dividing an exit pupil of the imaging lens to produce laterally shifted images; and
   means comprising a light receiving element array arranged circularly about the optical axis of the imaging lens for receiving the laterally shifted images.

2. An apparatus according to claim 1, wherein said lens aperture dividing optical system array and light receiving element array are arranged along a whole circumference of a circle.

3. An apparatus according to claim 1, wherein said lens aperture dividing optical system array and light receiving element array are arranged along a part of a circumference of a circle.

4. An apparatus according to claim 1, wherein said lens aperture dividing optical system array is formed by a stripe mask array arranged circularly.

5. An apparatus according to claim 1, wherein said lens aperture dividing optical system array is formed by a microprism array arranged circularly.

6. An apparatus according to claim 1, wherein said lens aperture dividing optical system array is formed by a fly-eye lens array arranged circularly.

7. An apparatus for detecting a focus condition of an imaging lens comprising
   means for dividing a light flux emanating from the imaging lens into first and second light fluxes;
   a first lateral image shift detection device comprising a first lens aperture dividing optical system array arranged circularly about an optical axis of the imaging lens for receiving the first light flux to divide an aperture of the imaging lens to produce a first pair of laterally shifted images, and a first light receiving element array arranged circularly about the optical axis of the imaging lens for receiving the first pair of laterally shifted images; and
   a second lateral image shift detection device comprising a second lens aperture dividing optical system array arranged circularly about the optical axis of the imaging lens for receiving the second light flux to divide the aperture of the imaging lens to produce a second pair of laterally shifted images, and a second light receiving element array arranged circularly about the optical axis of the imaging lens for receiving the second pair of laterally shifted images, whereby said first and second lateral image shift detection devices are arranged behind and before a predetermined focal plane of the imaging lens, respectively.

8. An apparatus according to claim 7, wherein said first lens aperture dividing optical system array and first light receiving element array are arranged over a whole circumference of a first circle, and said second lens aperture dividing optical system array and second light receiving element array are arranged over a whole circumference of a second circle.

9. An apparatus according to claim 7 wherein said first lens aperture dividing optical system array and first light receiving element array are arranged along a part of a circumference of a first circle, and said second lens aperture dividing optical system array and second light receiving element array are arranged along a part of a circumference of a second circle.

10. An apparatus according to claim 8, wherein said first and second circles are concentric relative to each other.

11. An apparatus according to claim 7, wherein said light flux dividing means comprises a prism including a half mirror and a reflection mirror.

12. An apparatus according to claim 10, wherein said light flux dividing means comprises a prism including a frustoconical half mirror and a frustoconical reflection mirror, these mirrors being arranged concentrically with the first and second circles.

* * * * *